June 14, 1960   R. K. BOYER ET AL   2,940,167
TIRE VALVE TOOL
Filed July 2, 1957
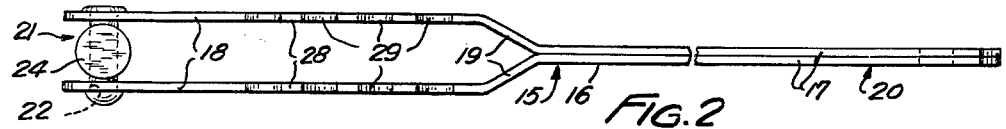
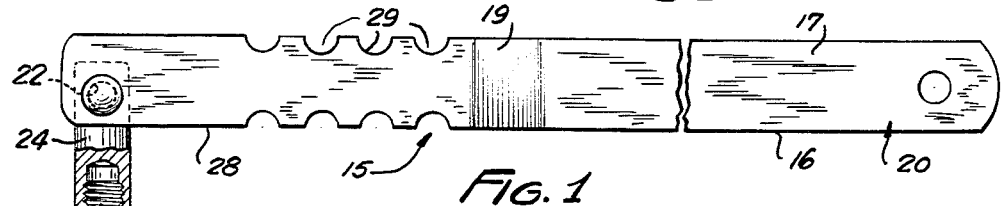
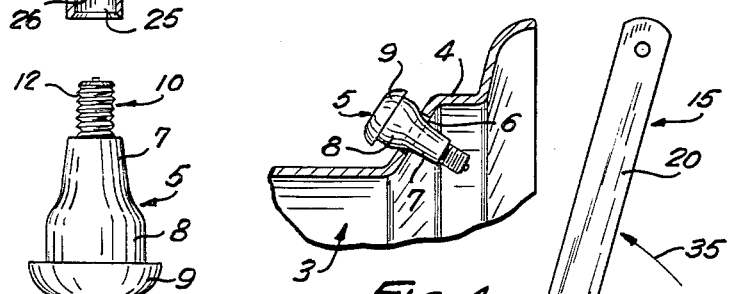
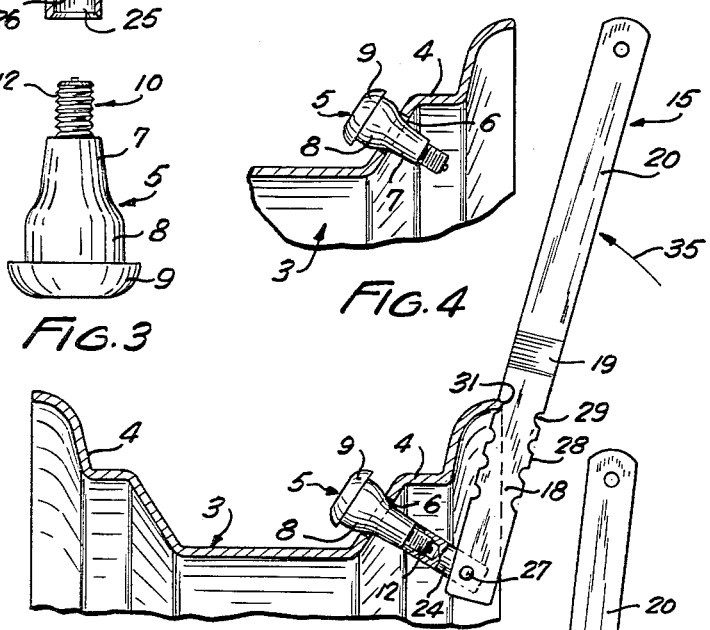
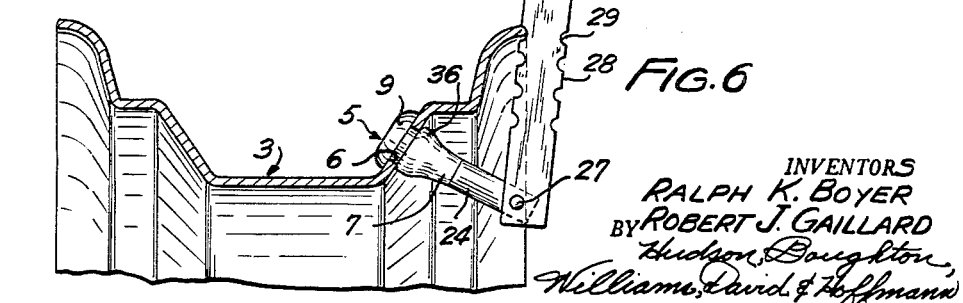
INVENTORS
RALPH K. BOYER
BY ROBERT J. GAILLARD
ATTORNEYS United States Patent Office 2,940,167
Patented June 14, 1960

2,940,167

TIRE VALVE TOOL

Ralph K. Boyer, Cleveland, and Robert J. Gaillard, Garfield Heights, Ohio, assignors to The Dill Manufacturing Company, Cleveland, Ohio, a corporation of Ohio Filed July 2, 1957, Ser. No. 669,673

2 Claims. (Cl. 29—267)

The present invention relates to a tool which is especially designed for inserting rubber valve stems into the standard valve stem opening in a rim adapted to mount tubeless tires.

The type of rubber valve stem referred to is so constructed that it may be forced or pulled into the valve stem opening provided in the rim from the inside of the latter until the stem is in proper operative position in the rim opening. Said rubber valve stem is usually provided with a rubber body portion which must be forced through the valve stem opening in the rim.

A principal object of the present invention is the provision of a tool for inserting a rubber valve stem for tubeless tires or the like into a valve stem opening in a tire supporting rim and which is readily applicable to various sizes and configurations of said type of rims.

Another object of the present invention is the provision of a tool for inserting a rubber valve stem into a valve stem opening in a tubeless tire supporting rim and further characterized by being readily applicable to different stems of this type and to various lengths of stems.

Yet another object of the present invention is the provision of a tool as above defined and further characterized by having means which can be positively connected to the rigid insert of the rubber valve stem so as to effectively transmit an inserting force from the tool to the stem.

A preferred embodiment of the tool of the present invention is herein illustrated and utilized for the insertion of a rubber valve stem into a rim for mounting tubeless tires and additional objects and advantages will be apparent to one versed in the art, upon reference to the description now to follow and the accompanying drawings which form a part of this specification, and wherein—

Fig. 1 is a view in longitudinal elevation of a tool embodying the present invention and shows the valve stem attaching means partially in section to illustrate its internal configuration;

Fig. 2 is a plan view of the tool in Fig. 1;

Fig. 3 is a view in vertical elevation of a rubber valve stem of the class adapted to be inserted into a rim opening by the tool of the present invention;

Fig. 4 is a fragmentary sectional view of a tubeless tire rim having a standard rim opening and shows the rubber valve stem of Fig. 3 partially disposed into said opening and prior to being connected to the tool of the present invention for inserting the stem in said rim opening;

Fig. 5 is a fragmentary sectional view somewhat similar to Fig. 4, but shows the tool of the present invention in its initial position on the rim and connected to the rubber valve stem prior to applying force effective to insert the same into the rim opening; and Fig. 6 is a fragmentary sectional view similar to Fig. 5, but shows the rubber valve stem in its final operative position in the rim opening and the position of the tool of the present invention on the rim after inserting said rubber valve stem and prior to disconnecting said tool from the latter.

Referring to the drawings, the numeral 3 represents a rim adapted to mount a tubeless tire (not shown), which rim may vary in its detailed configuration, but for illustrative purposes is shown as having opposed, concentric and outwardly inclined flange portions 4, one of which is provided with a standard valve stem opening 6; the foregoing construction being well known in the art.

In mounting a tubeless tire assembly onto the aforesaid rim, a rubber valve stem, such as of the type previously referred to, and in its present form being indicated in Fig. 3 by the numeral 5, is first inserted and secured within the valve stem opening 6 in the rim, and then the tubeless tire is placed onto the latter. Although there are various constructions of stems for tubeless tires, said valve stem, for illustrative purposes, is shown as consisting of a rubber body having a portion 7 of smaller diameter than the diameter of the valve stem opening, an intermediate cylindrical portion 8 in longitudinal extension with said first portion and which is of a diameter greater than the diameter of the valve stem opening, and a button-shaped head portion 9 whose diameter is greater than that of said cylindrical portion. The rubber valve stem 5 is also provided with a cylindrical, hollow insert 10 formed usually of a rigid material having an exteriorly threaded part 12 and a portion which extends centrally longitudinally into the rubber body and which is adhesively attached thereto. The valve stem illustrated is described in detail in our copending application Serial No. 451,121, filed August 20, 1954, now United States Patent No. 2,818,101, issued December 31, 1957, but the use of the tool embodying the invention is not limited to this particular stem.

The tool which forms the subject matter of the present invention and which is utilized to readily apply the required force to the rubber valve stem to effect its operative positioning in the rim opening comprises, in its instant construction, a unitary body 15 consisting of a pair of identical symmetrical elongated rectangular members 16, which members are each formed having a substantially flat portion 17 on its one end and an arm portion 18 in longitudinal extension with but offset transversely of the latter portion and integrally connected thereto by an inwardly inclined wall 19. In forming the body 15 the flat portions 17 of said members are placed one against the other in the manner shown in Figs. 1 and 2 forming thereby a handle portion 20 and are permanently fastened together by suitable means, for instance by spot welding such that the offset arm portions 18 extend longitudinally therefrom in spaced parallel relationship to each other, defining thereby a bifurcated or forked end 21. Suitable apertures 22 are provided in said arm portions adjacent the free ends of the latter, which apertures are in aligned relationship and are preferably offset relative to the longitudinal center of the body 15, the purpose for the latter construction being explained hereinafter.

A valve stem attaching member 24 having at one end a socket portion formed with an internal bore 25 extending longitudinally centrally therethrough and having a threaded portion at 26, is swingably suspended between the aforementioned arm portions 18 by means of a suitable headed pin or rivet 27 mounted adjacent the other end of said member and having its opposite ends extending into and through the aligned apertures 22. The size of the bore 25 is such as to accommodate the threaded end of the rigid insert in a rubber valve stem, which insert, and particularly its physical dimensions, has become standardized in the art. And in like manner, the threaded portion 26 of the bore 25 is of such form as to mesh with the threaded end of said rigid insert. In this manner, the tool of the present invention is releasably fastened to the rubber valve stem and, as will be hereinafter realized, is more positively effective than tools heretofore utilized, in mounting said stem in the rim opening.

Intermediate the attaching member 24 and the inclined wall 19, the opposed longitudinally extending edges 28 of each offset arm 18 are provided with a plurality of grooves or notches 29 spaced longitudinally therealong, the present construction, merely for purposes of disclosure, showing each of said opposed edges being provided with a group of four grooves or notches, wherein the latter, on adjacent edges of the offset arm portions, are preferably equally spaced and in transverse alignment.

The use of the tool, as above described, to effect the insertion of a rubber valve stem is as follows:

The rubber valve stem is first inserted into the valve stem opening in the rim 3 in the manner as is indicated in Fig. 4. The tool is then attached to the valve stem by inserting the rigid insert into the bore 25 and threadingly attaching the threaded portion 26 of said bore to the threaded portion 12 of said insert. The tool, and particularly the bifuracted portion 21, is pivotally moved about the pin 27 until the edge 31 of the adjacent rim flange 4 is disposed within one transversely aligned pair of grooves or notches 29, provided on adjacent edges of the offset arm portions 18 providing thereby a fulcrum about which the tool pivots on the rim flange. At this point it may be stated that the paricular pair of grooves selected depends upon the length of the valve stem and the configuration and size of the rim and its flange, and as is shown in Fig. 5, said pair of notches is selected such that the member 24 is substantially in longitudinal extension with the rigid insert of the valve stem such that when a force is applied to the tool in the manner presently described, it exerts a force substantially along the longitudinal axis of the valve stem. With the tool mounted on the valve stem and engaging the flange of the rim, a mechanical force is then applied to the handle portion 20 in the direction of the arrow 35, which handle functions as a lever arm operating about the edge 31 of the rim flange. As a result, said force is applied through the arm portions 18 to the pin 27 which is effective to exert a pulling force on the member 24, and the rigid insert connected thereto. This has a pulling effect in the direction of the longitudinal axis of the stem and the latter is forced into and located within the valve stem opening 6 in the rim 3. The tool is then moved to a position so as to enable the member 24 to be removed from its threaded engagement with the rigid insert 10 and the rim is then ready to mount the tubeless tire.

As previously described, the pin 27 mounts the valve stem attaching member 24 to the body 15 of the tool at a point that is spaced transversely from the longitudinal center of the arm portions 18. This particular construction is preferred since at present in the art, there are essentially five different lengths of rubber valve stems which have become more or less standardized. The present disclosure has utilized the shortest of the five sizes to describe the functioning of the tool of the present invention such that the maximum length of the socket 24 extends outwardly from the transverse edge of the forked end 21, as is shown in Fig. 4. However, it is realized that by rotating the socket approximately 180 degrees and turning the body over so as to utilize the groups of spaced notches 29 on the opposite edges 28 of the arm portions 18, said tool will be readily operative to effect the insertion of the longest of the five sizes of rubber valve stems in the same manner as above disclosed.

The tool of the present invention may also be utilized to remove rubber valve stems from a valve stem rim opening, and this is accomplished by attaching the tool to the rigid insert in the same manner as above described and then applying a larger force to the handle portion 20 than normally used to mount said valve stem and in the direction of the arrow 35 sufficiently to pull the valve stem completely through and out of the rim opening 6.

Having thus described in detail the preferred embodiment of my invention, it is realized that the same is susceptible of various modifications and adaptations without departing from the scope of the claims.

Having thus described our invention, we claim:

1. A tool for mounting a rubber valve stem in an opening in a tubeless tire wheel rim, the valve stem having a rigid threaded insert, said tool comprising an elongated body having a handle portion at one end thereof and a bifurcated portion defining transversely spaced arms extending longitudinally of said body at the other end thereof, said arms each having spaced fulcrum grooves defined in the opposite edges thereof for selectively engaging a rim with either side of the tool, a valve stem attaching member pivotally mounted between said arms and adapted to be moved between a first position extending from one side of said tool and a second position extending from the other side of said tool, said member being pivoted about an axis offset from the centerline of the tool so that said member extends farther from said centerline when in said first position than when in said second position whereby valve stems of different lengths may be accommodated.

2. A tool for mounting a rubber valve stem having a rigid threaded insert in an opening in a tubeless tire rim, said tool including an elongated body having a handle portion at one end thereof and a bifurcated portion defining transversely spaced parallel arms extending longitudinally of said body at the other end thereof, said arms each having a plurality of fulcrum grooves spaced along opposite edges thereof with the grooves in the edges of one arm being transversely aligned with the respective grooves in the adjacent edges of the other arm whereby either side of the tool may be selectively engaged with rims of different sizes, a valve stem engaging member having a threaded socket at one end thereof and being pivotally mounted between said arms at the other end thereof for movement between positions extending from either side of said tool, said member being pivoted about an axis offset from the centerline of said tool and adapted thereby to extend its maximum length from one side of said tool whereby short valve stems may be mounted with said one side of said tool engaging a rim and longer valve stems may be mounted with said other side of said tool engaging the rim.

References Cited in the file of this patent

UNITED STATES PATENTS

| 740,122 | Greenwood | Sept. 29, 1903 |
|---|---|---|
| 1,308,219 | Brucker | July 1, 1919 |
| 1,799,876 | Travis | Apr. 7, 1931 |
| 1,955,347 | Sherman | Apr. 17, 1934 |
| 2,018,902 | Schwedland | Oct. 29, 1935 |
| 2,256,061 | Tappen | Sept. 16, 1941 |
| 2,538,693 | Maisch | Jan. 16, 1951 |

FOREIGN PATENTS

| 308,455 | Great Britain | Mar. 28, 1929 |